«12» United States Patent
Berne

(10) Patent No.: US 11,130,475 B2
(45) Date of Patent: Sep. 28, 2021

(54) VEHICLE COMPRISING AT LEAST ONE CAMERA AND ONE CORRESPONDING WASHING SYSTEM FOR CLEANING THE CAMERA

(71) Applicant: Volvo Truck Corporation, Gothenburg (SE)

(72) Inventor: Nicolas Berne, Heyrieux (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 16/490,096

(22) PCT Filed: May 10, 2017

(86) PCT No.: PCT/IB2017/000798
§ 371 (c)(1),
(2) Date: Aug. 30, 2019

(87) PCT Pub. No.: WO2018/206997
PCT Pub. Date: Nov. 15, 2018

(65) Prior Publication Data
US 2020/0010055 A1     Jan. 9, 2020

(51) Int. Cl.
*B60S 1/56*      (2006.01)
*B08B 3/02*      (2006.01)
(Continued)

(52) U.S. Cl.
CPC ............... *B60S 1/56* (2013.01); *B08B 3/02* (2013.01); *B60R 11/04* (2013.01); *B60S 1/50* (2013.01);
(Continued)

(58) Field of Classification Search
CPC ...... B60S 1/56; B60S 1/50; B60S 1/52; B08B 3/02; H04N 5/2252; H04N 5/247;
(Continued)

(56) References Cited

U.S. PATENT DOCUMENTS

2002/0189650 A1\* 12/2002 Thompson .............. B65F 7/005
134/22.18
2006/0171704 A1\*  8/2006 Bingle ................... H04N 7/183
396/419
(Continued)

FOREIGN PATENT DOCUMENTS

DE    102015117612 A1    4/2017
DE    102015118670 A1    5/2017
(Continued)

OTHER PUBLICATIONS

International Search Report and Written Opinion for International Patent Application No. PCT/IB2017/000798, dated Jan. 12, 2019, 9 pages.

*Primary Examiner* — Loi H Tran
(74) *Attorney, Agent, or Firm* — Withrow & Terranova, PLLC

(57) ABSTRACT

The invention concerns a vehicle, comprising at least one camera and one corresponding washing system (3) for cleaning the camera, the washing system comprising a housing (10) for receiving the camera, a cleaning fluid storage tank (20), a nozzle (12) for spraying the cleaning fluid inside the housing and a pump (22) for pumping the cleaning fluid from the tank to the nozzle. The washing system further includes a passage (18) extending from the housing (10) to the tank (20), for draining, under gravity, used cleaning fluid back into the tank (20).

10 Claims, 4 Drawing Sheets

(51) Int. Cl.
*B60R 11/04* (2006.01)
*B60S 1/50* (2006.01)
*B60S 1/52* (2006.01)
*H04N 5/225* (2006.01)
*H04N 5/247* (2006.01)
*B60R 1/00* (2006.01)
*B60R 11/00* (2006.01)

(52) U.S. Cl.
CPC .............. *B60S 1/52* (2013.01); *H04N 5/2252* (2013.01); *H04N 5/247* (2013.01); *B60R 1/00* (2013.01); *B60R 2011/004* (2013.01); *B60R 2300/8046* (2013.01)

(58) Field of Classification Search
CPC ..... B60R 11/04; B60R 1/00; B60R 2011/004; B60R 2300/8046; B60R 2011/0082; B60R 2011/0092; B60R 1/0602
USPC ........................................................ 348/148
See application file for complete search history.

(56) References Cited

U.S. PATENT DOCUMENTS

| | | | |
|---|---|---|---|
| 2009/0283605 | A1* | 11/2009 | Arkashevski ............. B60S 1/50 239/13 |
| 2012/0117745 | A1* | 5/2012 | Hattori ..................... B60S 1/54 15/250.01 |
| 2015/0183406 | A1* | 7/2015 | Tanaka ..................... B60R 1/00 134/99.1 |
| 2015/0353024 | A1* | 12/2015 | Cooper ................ B60S 1/0848 348/148 |
| 2017/0210304 | A1* | 7/2017 | Davies .................. H04N 7/183 |
| 2018/0312141 | A1* | 11/2018 | Ghannam ................ B60S 1/56 |
| 2018/0319375 | A1* | 11/2018 | Weigle .................. B60S 1/481 |

FOREIGN PATENT DOCUMENTS

| | | |
|---|---|---|
| EP | 2252481 B1 | 4/2014 |
| KR | 20070022998 A | 2/2007 |
| WO | 2009101044 A2 | 8/2009 |
| WO | 2017202562 A1 | 11/2017 |

* cited by examiner

VEHICLE COMPRISING AT LEAST ONE CAMERA AND ONE CORRESPONDING WASHING SYSTEM FOR CLEANING THE CAMERA

This application is a 35 USC 371 national phase filing of International Application No. PCT/IB2017/000798, filed May 10, 2017, the disclosure of which is incorporated herein by reference in its entirety.

The present invention concerns a vehicle comprising at least one camera and one corresponding washing system for cleaning the camera. In particular, the invention relates to a vehicle, such as a truck, comprising side cameras replacing outside mirrors and an autonomous washing system for each camera. The invention could also apply to the rearview camera of a vehicle.

In the automotive industry, the trend is to equip the vehicles with onboard cameras for replacing the traditional outside mirrors. Indeed, a camera has significantly less windage than an outside mirror and helps then improving the aerodynamic behavior of the vehicle. Further, infrared cameras provide the driver with an enhanced vision in dark surroundings. Also, cameras are being used increasingly in the blind spot information systems, in the back-up assist systems of the vehicles and in the autonomous vehicles. However, given the importance of such functions, the cameras must provide reliable information.

To this end, the cameras should be cleaned regularly. For example, the cameras may be cleaned manually by the driver using a dry or damp cloth. However, there is a risk that the driver forgets to clean the camera. Also, the camera lens can be difficult to reach. For example, the side cameras replacing the outside mirrors of a truck are very high relative to the ground and are not accessible without special equipment (step ladder). Therefore, there exist automatic washing systems for cleaning the camera lens on a regular basis. These systems include a cleaning fluid container, at least one nozzle for pulverizing the cleaning fluid onto the lens and a pump for pumping the cleaning fluid from the container to the nozzle.

In the case of a truck comprising side cameras replacing outside mirrors, the cleaning fluid container is arranged on the lower frame, i.e. at the height of the wheels. Therefore, there is at least one pipe extending from the container arranged on the frame to the nozzles arranged at an upper part of the cabin where are located the side cameras. This pipe is routed inside the cabin, sometimes near electrical cables. Accordingly, any leak may have major consequences.

In addition, the side cameras of a truck are located above the two cabin doors. Therefore, when the cameras lenses are cleaned, cleaning fluid may drop on the sides of the truck, and in particular on the driver entering the cabin and/or on a person passing by the truck. This is obviously not desirable. Also, the cleaning fluid is not collected, so that the container has to be refilled quite often.

EP 2 252 481 B1 discloses a cleaning system for a camera system, wherein the nozzle pulverizing the cleaning fluid is located below the camera. Therefore, there is no recuperation of the used cleaning fluid. In particular, in the embodiment of FIG. 4, there is a hole for evacuating the used liquid, used liquid being probably spilled onto the roadway.

KR 2007 0022998 discloses a windshield washer system comprising a cleaning liquid container, a collector for collecting used cleaning liquid and pipes for conveying used cleaning liquid from the collector to the container. In this system, the collector is remote from the container. Accordingly, any leakage in the pipes may have major consequences, in particular if the pipes are located at proximity of electrical cables.

The aim of the present invention is to propose a vehicle that remedies the abovementioned drawbacks.

To this end, the invention concerns a vehicle, comprising at least one camera and one corresponding washing system for cleaning the camera, the washing system comprising a housing for receiving the camera, a cleaning fluid storage tank, a nozzle for spraying the cleaning fluid inside the housing and a pump for pumping the cleaning fluid from the tank to the nozzle. According to the invention, the washing system further includes a passage extending from the housing to the tank, for draining, under gravity, used cleaning fluid back into the tank.

Thanks to the invention, the cleaning fluid is recycled and there is no need to control the level of liquid inside the tank and to refill the tank, since the level of liquid inside the tank is always the same. Further, there is no evacuation of the cleaning fluid outside the truck, and then no risk of splashing the driver entering the cabin or a person passing by the vehicle. Advantageously, after a certain period of use, the tank is emptied and refilled with new cleaning fluid.

According to further advantageous features of the vehicle according to the invention, taken in isolation or in combination:
- The housing is directly attached to the tank or integral with the tank.
- A non-return valve is housed in the passage.
- The housing includes a movable trap for the passage of the camera.
- The movable trap flushes with the exterior of the cabin when it is closed.
- The washing system further includes a filter between the tank and the pump.
- Each camera is in a first position when the vehicle is moving and in a second position, different from the first position, when the vehicle is parked.
- Each camera includes a camera lens that is enclosed in the housing when the camera is in the second position.
- Each camera is foldable between the first position and the second position.
- The vehicle is a truck including two side cameras replacing outside mirrors and two corresponding washing systems that are arranged inside the truck cabin, above the cabin doors.

The invention will be better understood from reading the following description, given solely by way of two non-limiting examples and with reference to the appended drawings, which are schematic depictions, in which.

Figure 1:
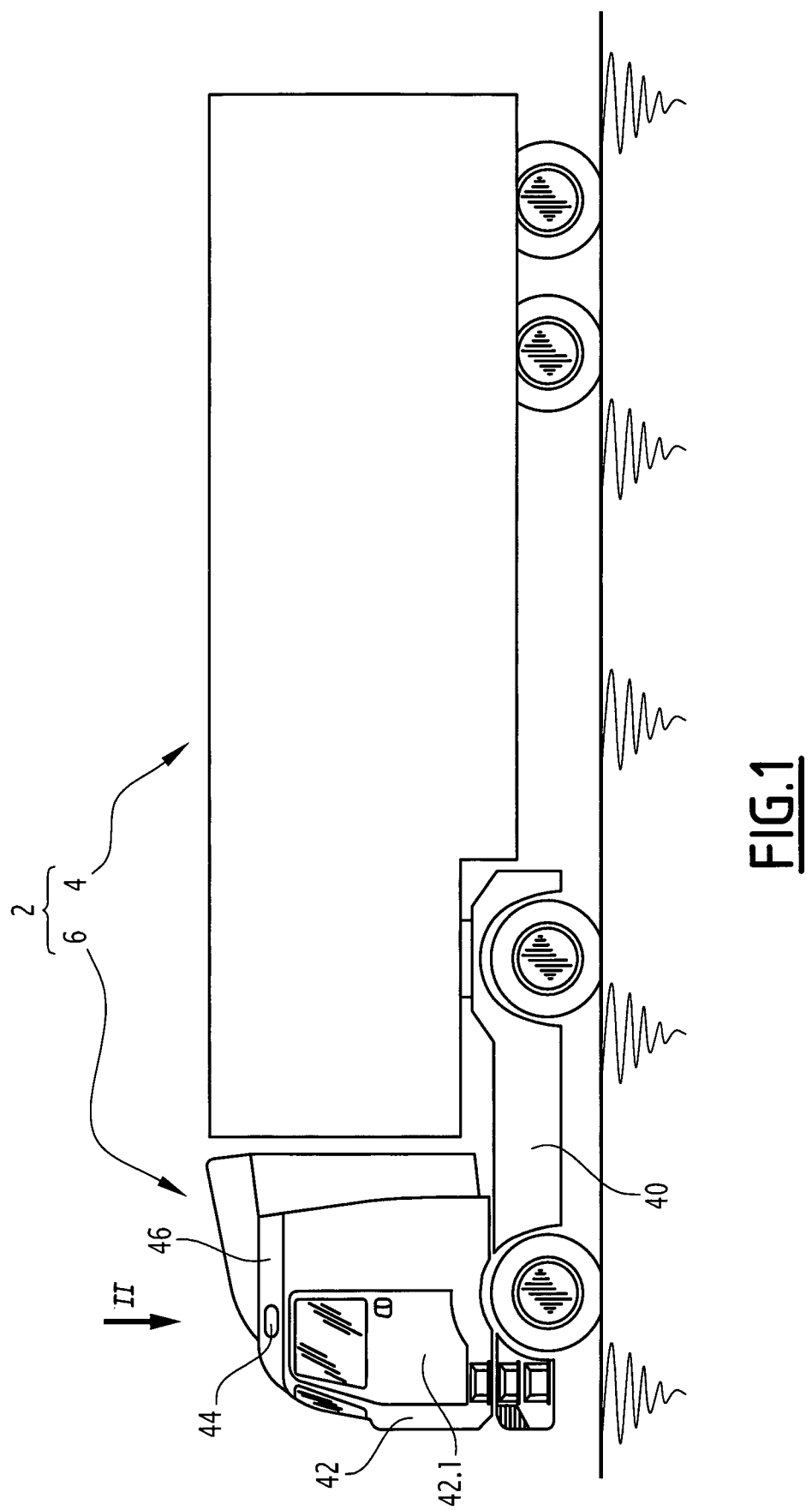
FIG. 1 is a side view of a vehicle, in particular a truck, according to a first embodiment of the invention, such vehicle including two side cameras replacing outside mirrors and two corresponding washing systems for cleaning the side cameras.

FIG. 1 represents, in side view, a vehicle which is, in the example, a truck 2. However, in a non-represented alternative embodiment, the vehicle may be different from a truck. For instance, the vehicle may a light-duty vehicle, a utility vehicle, an autonomous vehicle, etc.

The truck 2 includes a towing vehicle 4 and a trailer 6. Towing vehicle 4 has a lower frame 40, a cabin 42 with cabin doors 42.1 and a cabin roof 46. The truck is equipped with side cameras 44 replacing the outside mirrors of a conventional truck. In the example, the side cameras 44 are arranged above the cabin doors 42.1.

Figure 2:
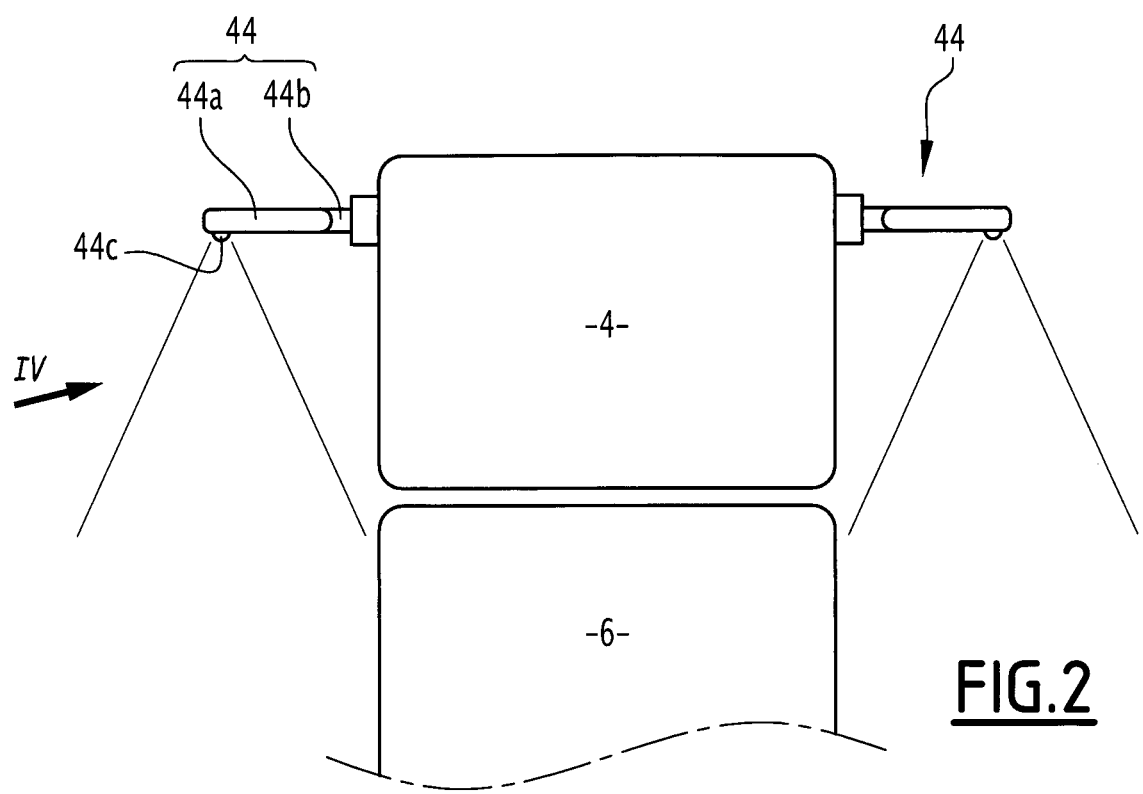
FIG. 2 is a partial view of the truck in the direction of arrow II in FIG. 1 (top view)
Figure 3:
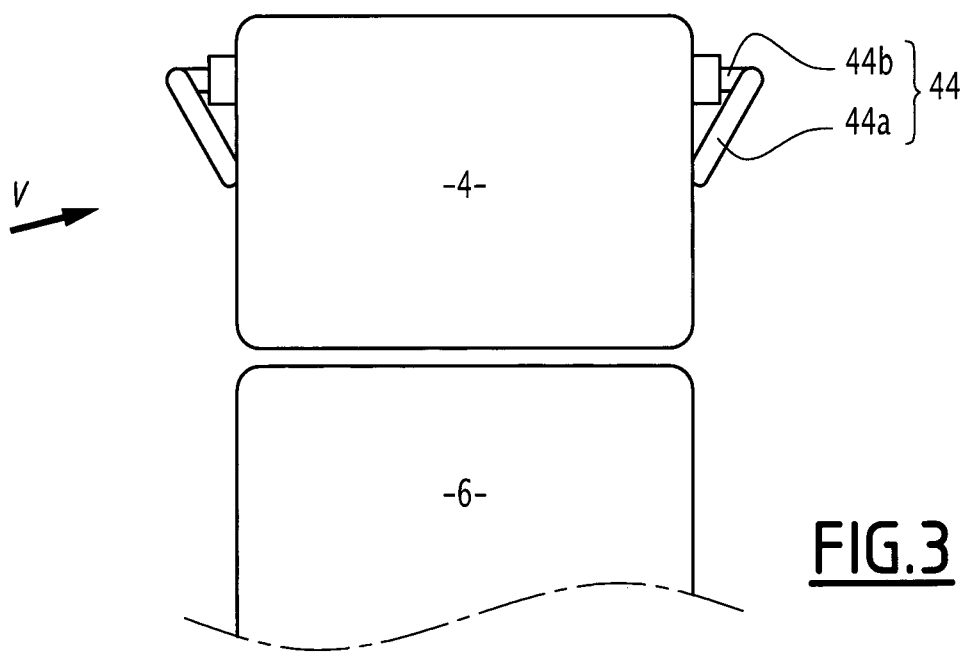
FIG. 3 is an illustration analog to FIG. 2, representing the side cameras in a folded position.
Figure 4:
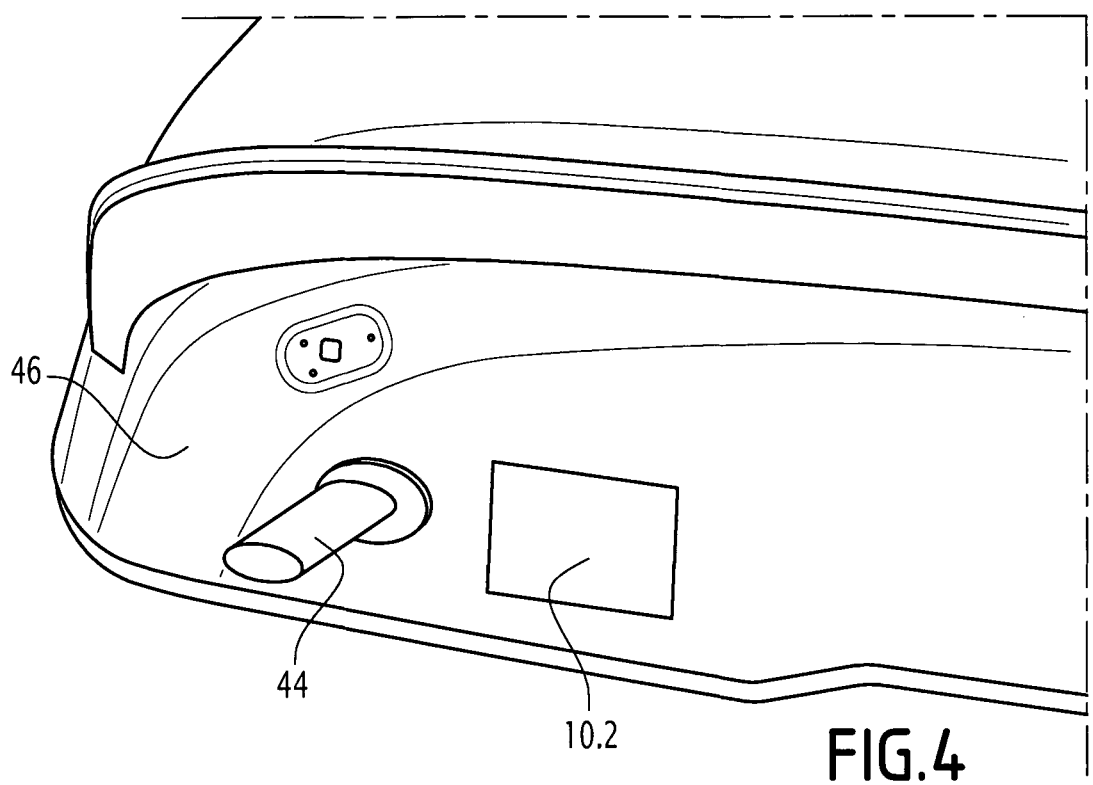
FIGS. 4 and 5 are partial side views, respectively according to arrows IV and V on FIGS. 2 and 3.

As shown on FIGS. 2 and 3, the side cameras 44 are foldable. In particular, the side cameras 44 are movable between a first position (unfolded position), represented on FIG. 2, wherein the side cameras 44 extend substantially in a perpendicular direction relative to the truck cabin and a second position (folded position), represented on FIG. 3, wherein the side cameras 44 are folded against the cabin wall.

Advantageously, the truck includes an actuator (not represented) for unfolding the side cameras 44 when the vehicle is started and for folding the cameras 44 when the vehicle is parked. Then, each camera 44 is in the first position when the vehicle is moving and in the second position when the vehicle is parked. Said actuator is known from prior art, that is why it is not described in detail.

In the example, the truck 2 may be considered as being parked when at least one of the following conditions is fulfilled:
 the driver leaves the cabin;
 the engine is turned off;
 the parking brake is engaged.

Conversely, the truck 2 may be considered as being started when at least one of the following conditions is fulfilled:
 the engine is turned on;
 the parking brake is released;
 the driver depresses the throttle;
 a gearbox ratio is engaged;
 the driver depresses the pedal brake.

Each side camera 44 includes a fixed part 44b attached to the truck cabin and a movable part 44a that is articulated on the fixed part 44b. The movable part 44a includes a camera lens 44c for recording, in real time, images on one side of the truck 2 (See detection cones on FIG. 2). Preferably, the camera lens 44c is arranged at the free end of the movable part 44a.

Advantageously, at least one, preferably two screens (not represented) may be arranged inside the cabin to display the images recorded by the two side cameras 44.

The side cameras 44 have to remain clean in order to provide reliable information. To this end, the vehicle 2 is equipped with a washing system 3 for each camera 44. In the example, truck 2 is then equipped with two washing systems 3 that are preferably arranged inside the truck cabin 42, above the cabin doors 42.1.

Each washing system 3 includes a housing 10 for receiving the camera 44, and in particular for receiving the camera lens 44c of the camera. In particular, the camera lens 44c is received inside the housing 10 when the camera 44 is in second position (folded position), i.e. when the vehicle is parked. Alternatively, the driver may have the possibility of cleaning the cameras 44, i.e. folding the cameras 44, for example when the vehicle is stopped at a red light. To this end, specific activation means may be provided inside the cabin.

Each washing system 3 also includes a cleaning fluid storage tank 20, a nozzle 12 for spraying the cleaning fluid, inside the housing 10, onto the camera lens 44c and a pump 22 for pumping the cleaning fluid from the tank 20 to the nozzle 12.

In the example, the housing 10 has a rectangular section and includes a bottom wall 10.1, a front wall 10.2 and two side walls. The two side walls are perpendicular to the cabin wall, while the front wall 10.2 is parallel to the cabin wall. 10.3 denotes the side wall of the housing 10 (among the two side walls) that is the closest one from the camera 44.

Advantageously, the nozzle 12 is a hole arranged in one of the side walls of the housing 10, in particular in the side wall 10.3. This hole is oriented so as to spray cleaning liquid along a direction that is substantially perpendicular to the side wall 10.3. Accordingly, the spray of cleaning liquid is inclined or parallel to the surface of the camera lens, i.e. not perpendicular to the surface of the camera lens 44c. Thanks to this configuration, the spray of cleaning liquid removes effectively the dust gathered on the camera lens surface.

The washing system 3 includes a passage 18 for draining used cleaning fluid back into the tank 20. Accordingly, the passage 18 extends vertically. The passage 18 has a first end 16 opening on the inside of the housing 10 and a second end opening on the inside of the tank 20. The first end 16 is a top end, while the second end is a bottom end. The first end 16 is formed by a hole in the bottom wall 10.1 of the housing 10. The tank 20 is then arranged below the housing 10, so that used cleaning fluid may be drained under gravity back into the tank 20. In other words, there is no need for an additional pump (and energy) to convey the used cleaning fluid from the housing 10 to the tank 20.

Figure 5:
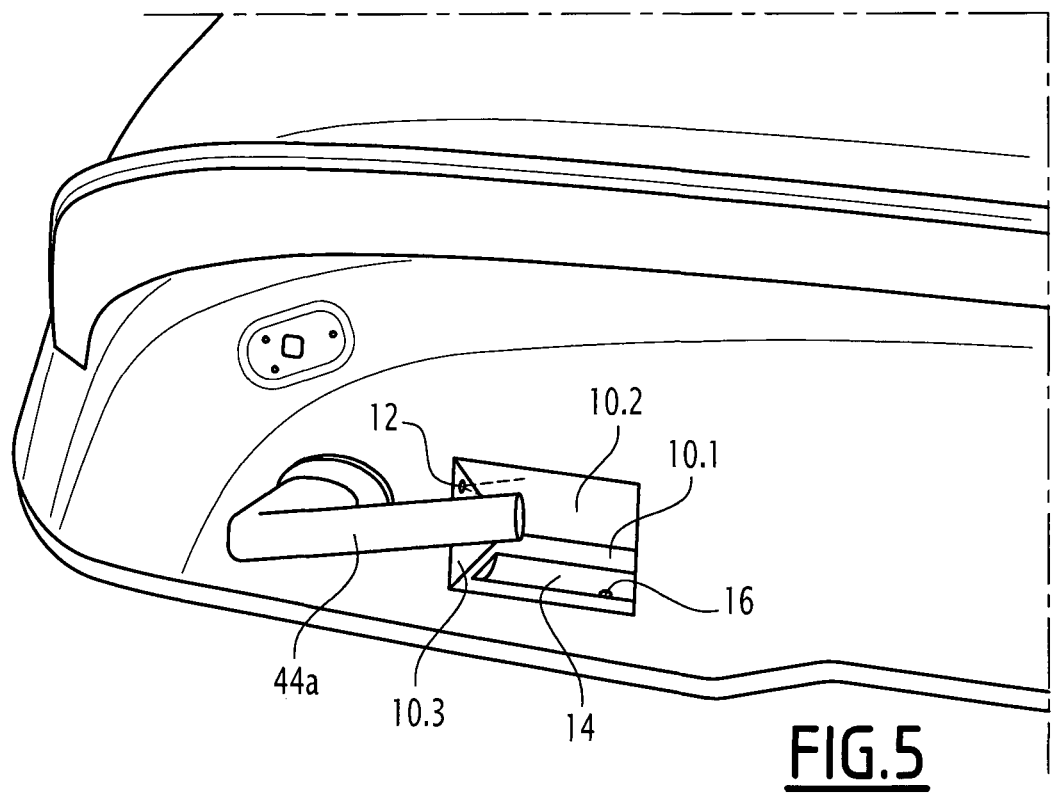
Figure 6:
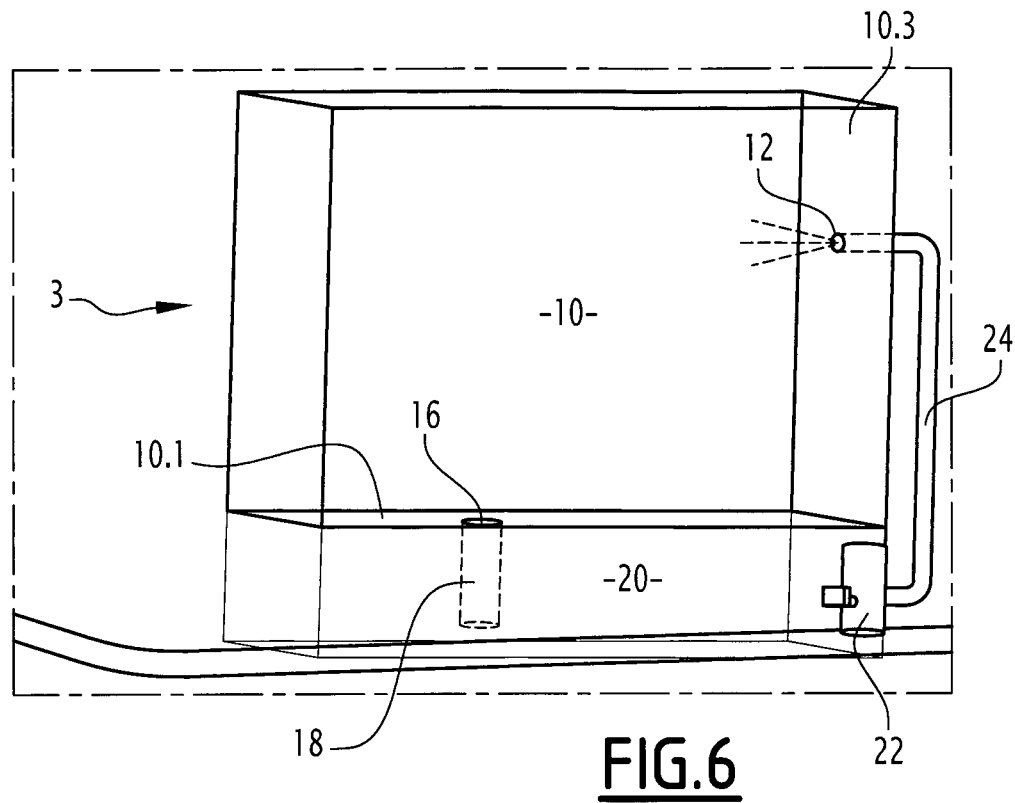
FIG. 6 is an inside and partial view of the truck cabin of FIG. 1.

Preferably, and as shown on FIG. 5, the hole 16 is arranged in a collector 14 forming a recess in the bottom wall 10.1 of the housing 10.

Advantageously, the housing 10 is directly attached to the tank 20. This means that the tank 20 is not remote from the housing 10. In particular, this is different from the system of KR 2007 002 299 8 wherein the collector of used liquid is remote from the container located under the hood of the vehicle.

Optionally, a non-return valve (not represented) is housed in the passage 18. This non-return valve prevents the cleaning fluid stored into the tank 20 from flowing into the housing 10 through passage 18. Such non-return valve is known from prior art, that is why it is not described in detail.

In the example, the front wall 10.2 of the housing 10 is a movable trap for the passage of the camera 44. In the example, this trap is articulated towards the inside of the housing 10. The movable trap flushes with the exterior of the cabin 42 when it is closed, so that the washing system 3 does not increase the wind resistance of the vehicle in driving conditions.

Optionally, the washing system further includes a filter (not represented) between the tank 20 and the pump 22. This filter allows filtering out dirt so as to avoid clogging the pump 22. This filter may be removable, so that it can be easily cleaned or replaced.

When the vehicle 2 is parked, for example when the engine is turned off, the side cameras 44 move from their first position to their second position. Each side camera 44 pushes the movable trap 10.1 of the housing 10 so that the camera lens may enter into the housing 10. Then, cleaning liquid is sprayed onto the camera lens 44c. Used cleaning liquid flows, under gravity, through the hole 16 and the passage 18, and is recuperated into the tank 20.

When the vehicle drives off, for example when the engine is started, the side cameras 44 move back in their first position. The movable trap 10.1 moves back into a closed position under gravity.

Figure 7:
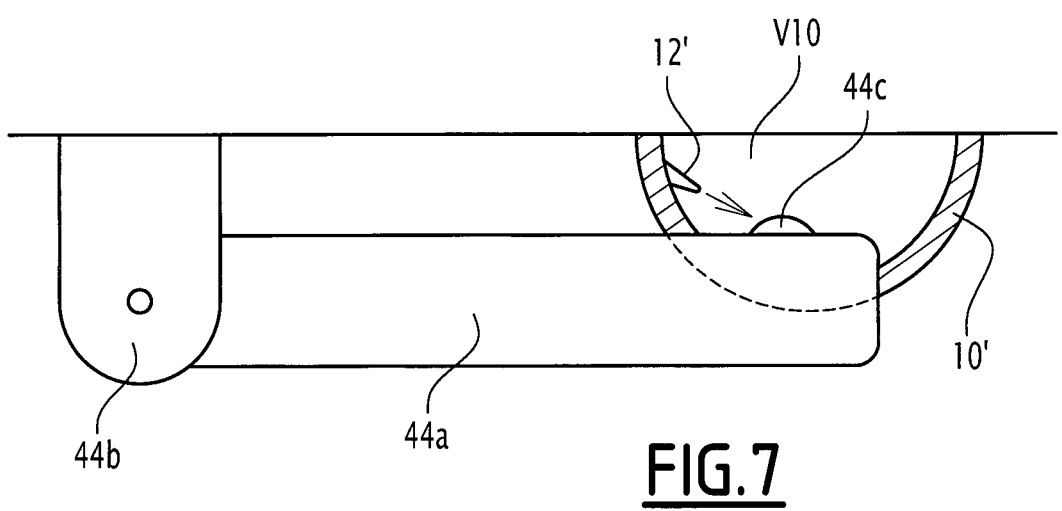
FIG. 7 represents, in top view, a washing system of a vehicle according to a second embodiment of the invention.

FIG. 7 represents a washing system for a vehicle according to a second embodiment of the invention. For the purpose of conciseness, only the differences relative to the first embodiment are mentioned here-after.

In the second embodiment, the camera lens 44c is enclosed in the housing 10' when the camera is in the second position. This means that the housing 10' is shaped so as to form a closed volume V10 when the camera 44 is in second position (folded position). Thanks to this configuration, the camera lens 44c does not gather external dust when the vehicle is parked, in particular when the vehicle is parked for a long time. Accordingly, the cleaning frequency is less important.

Preferably, there is no movable trap: the housing 10' remains open in driving conditions. In the example, the housing 10' has a semi-circular section.

In a non-represented alternative embodiment, the housing 10 is integral with the tank 20.

In another non-represented alternative embodiment, the camera is a rearview camera.

In another non-represented alternative embodiment, a locking mechanism can be added to prevent camera theft. This locking mechanism could be a pin that prevents manual unfolding.

The features of the two described embodiments and of non-represented alternative embodiments may be combined together in order to generate new embodiments of the invention.

The invention claimed is:

1. Vehicle, comprising at least one camera and one corresponding washing system for cleaning the camera, the washing system comprising:
    a housing for receiving the camera,
    a cleaning fluid storage tank,
    a nozzle for spraying the cleaning fluid inside the housing, wherein the nozzle is a hole arranged in a sidewall of the housing;
    a pump for pumping the cleaning fluid from the tank to the nozzle, characterized in that the washing system further includes a passage extending from the housing to the tank, for draining, under gravity, used cleaning fluid back into the tank.

2. Vehicle according to claim 1, characterized in that the housing is directly attached to the tank or integral with the tank.

3. Vehicle according to claim 1, characterized in that a non-return valve is housed in the passage.

4. Vehicle according to claim 1, characterized in that the housing includes a movable trap for the passage of the camera.

5. Vehicle according to claim 4, characterized in that the movable trap flushes with the exterior of a cabin when it is closed.

6. Vehicle according to claim 1, characterized in that the washing system further includes a filter between the tank and the pump.

7. Vehicle according to claim 1, characterized in that each camera is in a first position when the vehicle is moving and in a second position, different from the first position, when the vehicle is parked.

8. Vehicle according to claim 7, characterized in that each camera includes a camera lens that is enclosed in the housing when the camera is in the second position.

9. Vehicle according to claim 7, characterized in that each camera is foldable between the first position and the second position.

10. Vehicle according to claim 1, characterized in that the vehicle is a truck including two side cameras replacing outside mirrors and two corresponding washing systems that are arranged inside a truck cabin, above cabin doors.

\* \* \* \* \*